July 10, 1928. Re. 17,032

J. STUMPF

METHOD AND MEANS FOR DELIVERING PREHEATED FEEDWATER

Original Filed May 27, 1925 5 Sheets-Sheet 1

Inventor:
Johann Stumpf,
By Geo. Cozzdale
Attorney

July 10, 1928. Re. 17,032

J. STUMPF

METHOD AND MEANS FOR DELIVERING PREHEATED FEEDWATER

Original Filed May 27, 1925 5 Sheets-Sheet 2

Inventor:
Johann Stumpf,
by Mott Broadale
Attorney.

July 10, 1928. Re. 17,032

J. STUMPF

METHOD AND MEANS FOR DELIVERING PREHEATED FEEDWATER

Original Filed May 27, 1925 5 Sheets-Sheet 3

Inventor:
Johann Stumpf,
By W. D. Rozdale
Attorney.

July 10, 1928. Re. 17,032
J. STUMPF
METHOD AND MEANS FOR DELIVERING PREHEATED FEEDWATER
Original Filed May 27, 1925 5 Sheets-Sheet 4
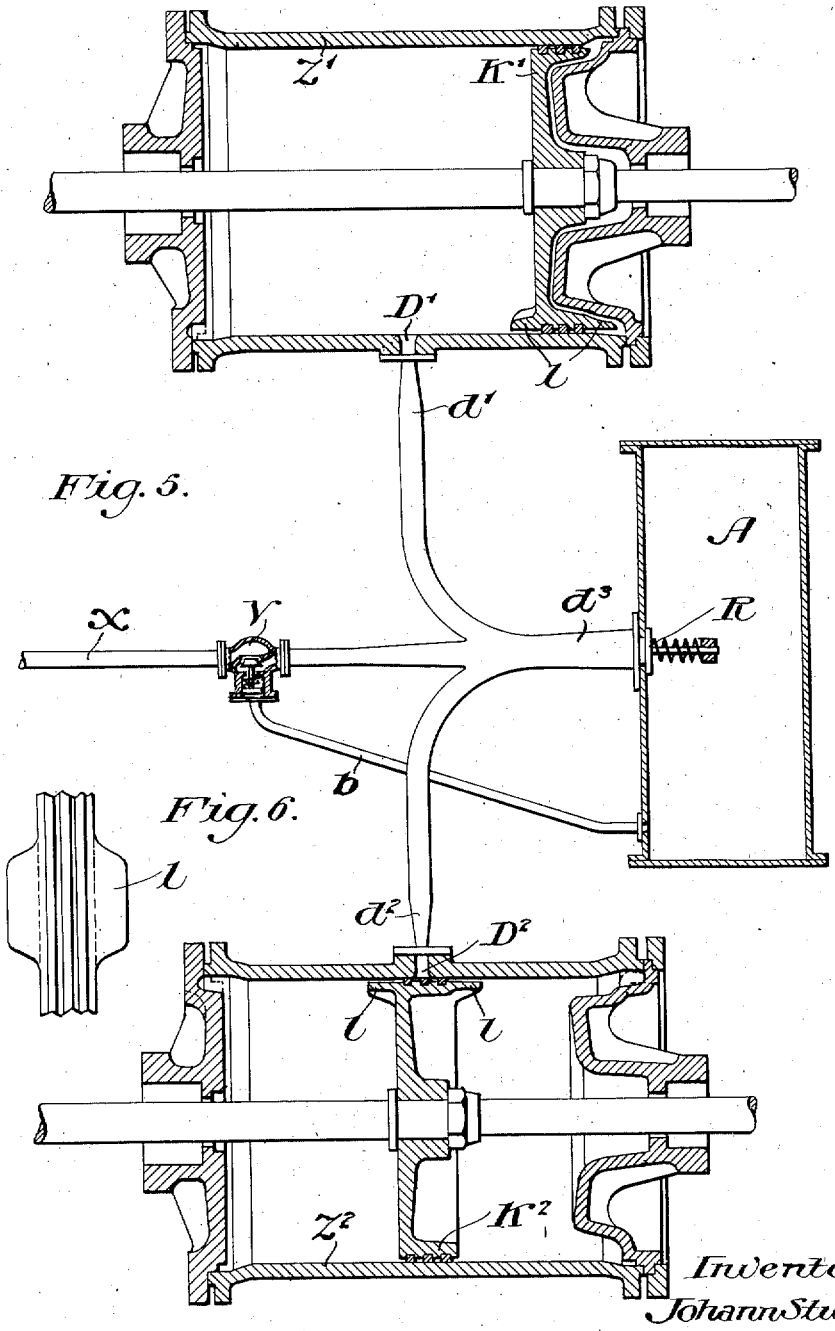
Inventor:
Johann Stumpf,
By
Attorney.

July 10, 1928. Re. 17,032

J. STUMPF

METHOD AND MEANS FOR DELIVERING PREHEATED FEEDWATER

Original Filed May 27, 1925 5 Sheets-Sheet 5

Inventor:
Johann Stumpf,
By Robert Dale
Attorney.

Reissued July 10, 1928. Re. 17,032

UNITED STATES PATENT OFFICE.

JOHANN STUMPF, OF BERLIN, GERMANY.

METHOD AND MEANS FOR DELIVERING PREHEATED FEED WATER.

Original No. 1,616,239, dated February 1, 1927, Serial No. 33,092, filed May 27, 1925, and in Germany May 31, 1924. Application for reissue filed August 25, 1927. Serial No. 215,489.

This invention relates to an improved method for delivering pre-heated water to boilers or steam generators, more particularly high pressure steam generators, by means of injectors, and the invention also embodies a convenient form of compound or multi-stage injector apparatus for carrying the process into effect. The invention may be applied to locomotives, locomobiles or any form of steam generating plant.

It has long been recognized that steam injectors may be used to supply pre-heated water under pressure to a boiler, and the practice hitherto has been to use one stage in steam and water and to limit the temperature of the feed or the inlet water to the injector so as to ensure safe suction and efficient injector action by quick condensation of the steam. It has been assumed that in connection with a single stage injector there was a maximum temperature at which the feed water could be supplied to the injector and also that there is a maximum temperature, below 212° F., at which the commingled stream of feed water and condensed injector steam could be delivered from the injector into the boiler. (See The Steam Engine by Dr. J. Perry 1900, page 615.)

As is generally known, the total intrinsic energy of the steam entering the injector is utilized in part to raise the kinetic energy of the combined feed water and condensed injector steam and in part to raise the temperature of this combined stream. This kinetic energy is subsquently transformed into pressure energy in the diffuser or tapered delivery pipe of the injector and in this way the feed water is forced into the boiler against the working pressure of the fluid therein.

I have now found that by compounding injectors in what is analogous to the reverse manner in which prime movers are compounded, the top limit of feed temperature as hitherto understood can be considerably exceeded, and I thus recover more heat energy of the working fluid, that is the part of the intrinsic energy of the injector steam which appears in the commingled stream as increase of temperature in the water delivered. The injector may be arranged in two or more stages.

In compounding injectors the steam in the first stage is expanded to atmospheric pressure or, if the injector is drawing from the condenser, to the condenser pressure, and the commingled stream at increased pressure and temperature is passed to the inlet of the second stage injector in which the injector steam is expanded down to the inlet water pressure. The limit of temperature of the discharge from the second stage injector is no longer a temperature beneath 212° F. the boiling point at atmospheric pressure, but if the commingled stream is at a pressure of 2 atmospheres absolute the temperature would be something less than 250° F. If a third stage is added and the delivery from the second stage is at say 5 atmospheres absolute, the top limiting temperature will be something less than 300° F.

When applied to a steam power plant, the invention offers advantages additional to these associated immediately with the compounding or staging of the injector. As is well known, the auxiliaries, such for example as the feed pumps, air pumps or lighting power plant in a locomotive or other power units, do not use the steam expansively, or do so only to a small degree. There is thus provided ready to hand a plurality of sources of supply of steam at different pressures. It is not, therefore, necessary to use high pressure steam in each stage of the injector, but the first stage may use low pressure steam and each successive stage may be supplied with a successively higher pressure steam. In this way, the injector stage does not merely function as a stage in the upgrading of the temperature and pressure of the feed water, but also as a second expansion stage of the incompletely expanded steam from the auxiliaries.

The only losses encountered in the injector are those due to heat radiation and conduction, and those due to friction of the fluid in the passages of the injector. By arranging the injector in stages in the manner set forth, the velocities in the injector nozzles are those due to the difference in head between the incoming water pressure and the outgoing water pressure. By increasing the pressure in stages the velocity is in all stages retained within reasonable limits. When it is recollected that the frictional losses increase in proportion to $v^2$ where $v$ is the velocity of the stream, it will be recognized that also the pumping action is materially improved by this arrangement of the injector in stages in addition to the improved heating action.

If more stress yet is laid on the heating action it may be done by damaging the pumping action, for example, by artificial leakage, thereby increasing the steam consumption and consequently the heating action.

The invention will be more readily understood from the following description, reference being made to the accompanying drawings in which:—

Fig. 5 shows a device to draw off exhaust steam from common steam cylinders at higher pressure.

Fig. 6 shows a detail of a steam piston suitable therefor.

Figure 1:
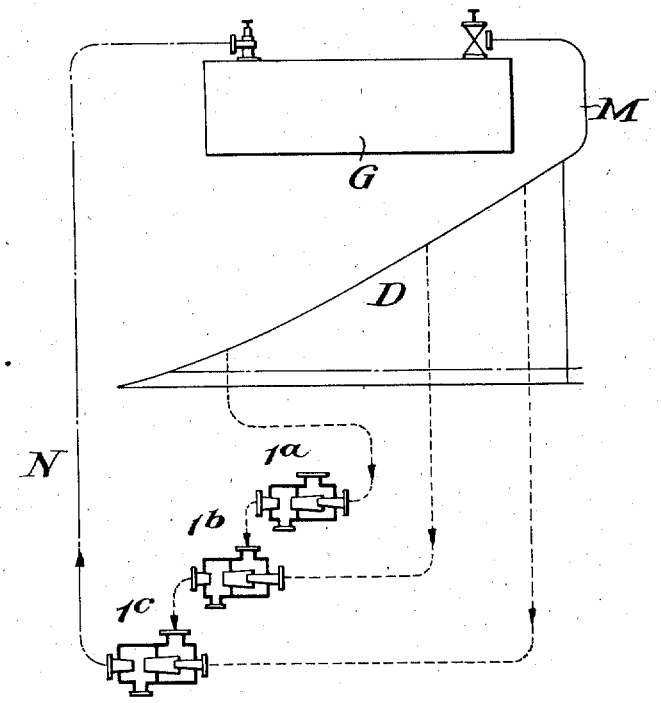
Fig. 1 is a diagram showing my improved process for supplying feed water to a steam generator by means of a multi-stage injector apparatus.
Figure 4:
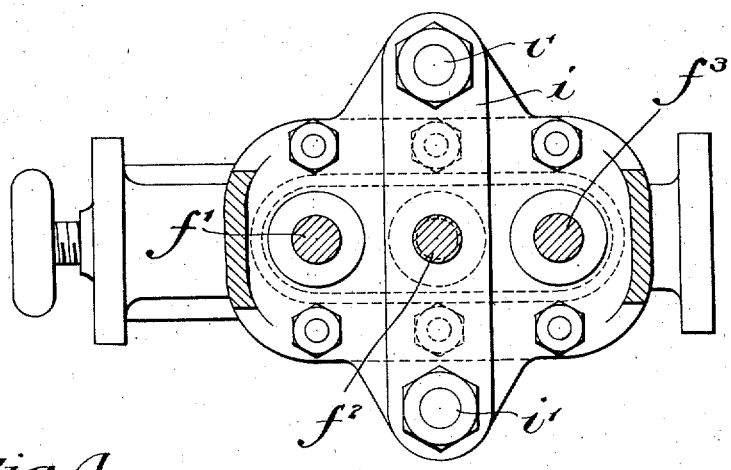
Fig. 4 is a plan view in section on the line AB of Fig. 2.

In carrying the invention into effect, steam from a generator G passes by steam mains M to any form of prime mover plant or other apparatus where it is used expansively as indicated in the steam diagram D. Three injectors $1^a$, $1^b$, $1^c$ are connected up, as regards their steam supply, to points in the plant where the boiler steam has been used or partially used expansively. The injector $1^a$ is connected up to a source of steam supply at a low pressure, for example, the exhaust steam from the main engine. This injector may draw water from a cold supply. The steam in this injector will only have a very small range of pressure fall, and the effect will be principally to raise the temperature of the feed to the next injector stage $1^b$ which receives the water at increased pressure, say $P^a$. The steam supply to the injector stage $1^b$ will be expanded down to the pressure $P^a$ and not to atmospheric pressure, whereby the kinetic energy of the combined stream of inlet water and condensed steam in $1^b$ is increased by an amount corresponding to the pressure difference between $P^b$, the outlet pressure from injector $1^b$, and $P^a$, the outlet pressure from injector $1^a$. The temperature of the combined stream from $1^b$ is further increased by the condensation of the injector steam $1^b$ and this combined stream at higher pressure and temperature passes to the next stage $1^c$.

Stage $1^c$ may be operated by live steam or by steam of about live steam pressure. This final stage may force the water through pipe N into the boiler with an increased temperature which may be not far below the boiling temperature of the boiler.

It will be understood that any desired number of stages may be interposed. The various sources of supply of steam of different pressure may be obtained from widely different kinds of plant, thus in the case of turbines, the injector steam may be withdrawn from the turbine case at different stages in the expansion of the steam.

The heating action is increased the more exhaust steam and the more head is used for this exhaust steam, which latter may imperil the safe suction action to some extent. Within this limit exhaust steam should be used as much as possible. The same holds true for the interposed stages in which operating steam has been used with a partial drop of pressure in other steam motors.

Also the exhaust steam of the first stage should have some pressure and not too large a head to work against this for ensuring a safe suction. Exhaust steam of some pressure may be secured by the device shown in Figure 5. The two cylinders $Z'$ $Z^2$ of a locomotive are tapped in the middle of the piston stroke. The nozzle-like tap holes $D'$ $D_2$ and conductors $d'$ and $d^2$ lead the steam together ejector-like, thus drawing off exhaust steam almost entirely expanded by the steam flowing out under some pressure from the other cylinder. The advance in opening the exhaust nozzles may be from 30–40% of the piston stroke. This advance may be decreased by suitable laps $l$ at the pistons $K'$ $K_2$ as shown in Figure 6, which may be also omitted entirely. The diffuser $d_3$ will bring up the pressure of the combined exhaust stream in accordance with its kinetic energy. The check valve R is not supposed to work at each stroke but only, if the engine stops or is working slightly. A pressure regulating valve V is kept closed by sufficient steam pressure of the exhaust steam receiver A, brought on the closing piston of the valve V by the pipe $b$. A spring under this piston will open valve V under insufficient pressure of receiver A and will admit live steam through pipe X, thus maintaining always a certain pressure in the receiver A, which can readily be adjusted by adjusting the spring in valve V.

In modern injectors the action is not readily adjusted—that is to say, there is only a relatively small range between the maximum and minimum deliveries against a given pressure.

This is owing to the fact that in injectors as hitherto used, the adjustment has been effected by throttling the steam.

In order to obtain the best action of the injector, the cross section of the steam nozzle, the water nozzle and the diffuser should always remain in a definite relation to one another, if possible under constant widening of the steam nozzle and the diffuser. An alteration of the steam supply disturbs the mutual relations of the cross sections of the parts mentioned, and this has the effect of seriously limiting the degree of adjustability or range of adjustment of the injector.

These difficulties associated with ordinary injectors are accentuated when dealing with a multi-stage injector but they may be overcome in both single stage and multi-stage injectors by simultaneous adjustment of the steam and water nozzles, and preferably also of the diffuser.

In multi-stage injectors the various adjustments might be made separately for each stage, but it is preferable that all the injectors which are arranged in series should be adjusted simultaneously, and proportionately by a single operating member.

Figure 2:
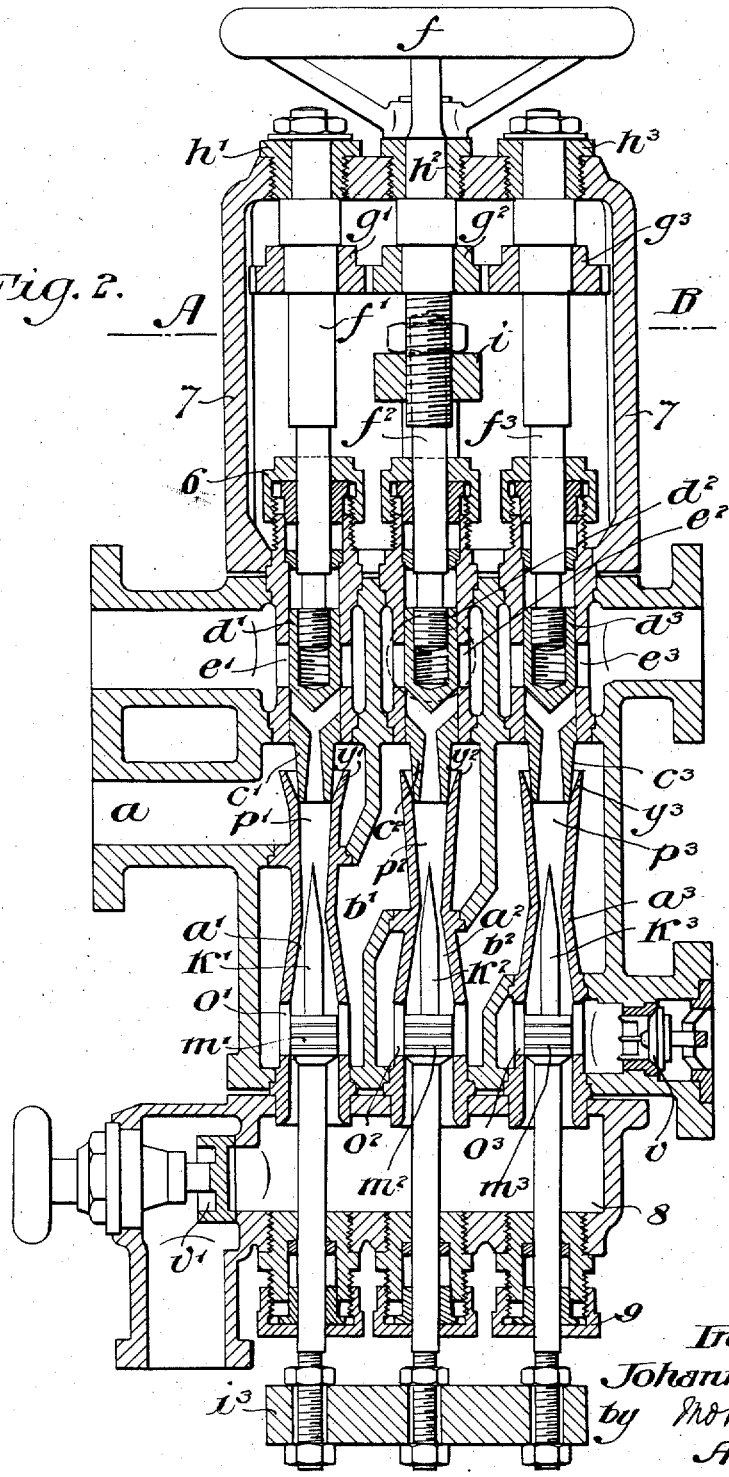
Fig. 2 is a section of a convenient form of multi-stage injector.
Figure 3:
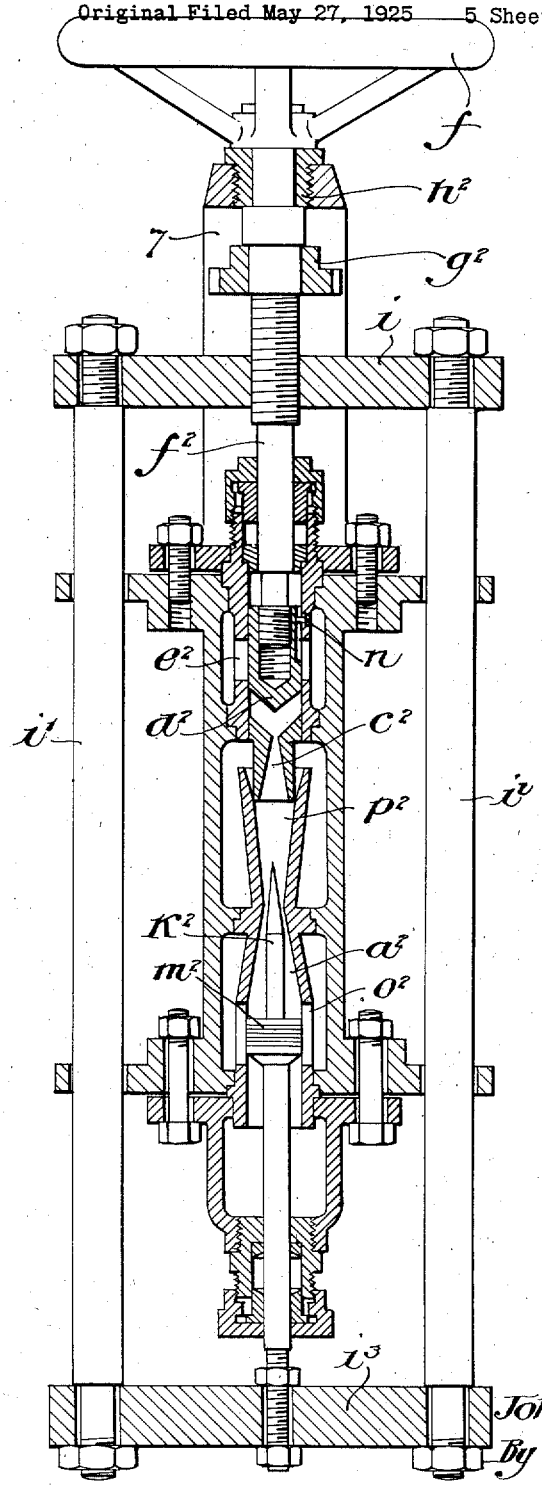
Fig. 3 is a section taken at right angles to that shown in Fig. 2.

Referring to Figure 2, the invention is here shown applied to a three stage injector adapted to carrying out the process described with reference to the diagram in Figure 1. The inlet water to the first stage of the injector enters by the pipe $a$ and is drawn by the steam issuing from the nozzle $c'$ into a contracting and expanding mixer and diffuser $p'$. The steam conveniently from a low pressure source, enters by the ports $e'$ and the water by port $y'$ both of which are controlled by the cylindrical part of the slidable nozzle $c'$. This cylindrical part is prevented from turning by a notch $n$, Fig. 3, and internally threaded and is engaged by a thread on the end of a rotatable rod, $f'$ which passes upwards through a suitable stuffing box 6 and is supported in a bush $h'$ carried by the frame 7. The rod or spindle $f'$ has keyed on to it a gear wheel $g'$ which gears with the gear wheel $g^2$ on a central rod $f^2$. The rod $f^2$ is arranged similarly to the rod $f'$ and operates the nozzle body $d^2$ which controls ports $e^2$ and the steam nozzle $c^2$ and the water nozzle $y^2$ of the second injector stage. The spindle $f^2$ passes through a bushing $h^2$, and has a hand wheel $f$ keyed thereon. The gear wheel $g^2$ engages a third gear wheel $g^3$ fixed on a spindle $f^3$, housed in a bushing $h^3$ and adapted in a manner similar to the spindle $f'$ to control a nozzle body $d^3$ which opens or closes steam port $e^3$ for the supply of steam to the third steam nozzle $c^3$ and the water port $y^3$ of the third injector stage. The spindle $f^2$ is also in threaded engagement with the yoke $i$ for controlling the diffusers or mixing tubes. It will be understood that the several threaded engagements are so arranged and directed relatively, that the yoke $i$, on the one hand, and the several nozzle bodies $d'$ $d^2$ and $d^3$, on the other hand, are simultaneously actuated in opposite directions. The diffusers or mixing tubes $p'$, $p^2$, $p^3$, providing the condensing spaces, are suitably designed for the quantities of water passing therethrough and the normal increase in pressure at which they are intended to work.

Tapered control rods $k^1$, $k^2$, $k^3$ project upwardly through the expanding or diffuser part of the mixing tubes for the purpose of controlling the free area at the most constricted point of the mixing and diffusing tubes as well as the taper ratio of the diffuser. The control members $k^1$, $k^2$, $k^3$ have valves $m'$, $m^2$, $m^3$ fixed on them which are adapted, when the injector has been started up, to close successively and thus shut off the overflow which escapes by the valve $v'$ at the bottom left hand side of Figure 2. It will be seen from Figure 2 that the valves $m'$, $m^2$, $m^3$ are at different and increasing heights above their overflow ducts. By moving the rods $k'$, $k^2$, $k^3$ simultaneously downwards, the valve $m'$, first closes the overflow from the low pressure injector so that the delivery from this injector then takes place through the ports $o'$ to the chamber $b'$ which is the inlet chamber to the second injector stage. A further downward movement allows the valve $m^2$ to close its overflow-duct, whereupon the delivery from the second injector takes place through the ports $o^2$ to the chamber $b^2$ which is the inlet chamber of the third injector stage. A still further downward movement allows the valve $m^3$ to close its overflow-duct whereupon the discharge from the third injector stage takes place through ports $o^3$ and the delivery valve $v$ from the multi-stage injector.

The downward movement described is effected by extending the rods $k'$, $k^2$, $k^3$ downwards through the overflow chamber 8 and stuffing boxes 9 to be coupled to a spider frame $i^3$. The spider $i^3$ is in the form of a cross, and the arms at right angles to those shown in Figure 2 (see Figure 3) are connected by rods $i'$ to a yoke $i$ which engages a thread on the central spindle $f^2$. In this way when the hand wheel $f$ is rotated, the nozzle bodies $d'$, $d^2$, $d^3$ are simultaneously operated; the steam nozzles $c'$, $c^2$, $c^3$ and water nozzles $y'$, $y^2$, $y^3$ are operated to control the steam inlet area and water inlet area for the three injector stages; the constrictions and tapers of the mixing and diffuser tubes are adjusted by the controlling members $k'$, $k^2$, $k^3$ and the overflow valves $m'$, $m^2$, $m^3$ are operated. It will be understood that after the valves $m'$, $m^2$, $m^3$ have closed their overflow ducts, a further downward movement of the yoke $i^3$ is combined with an upward movement of the above described cylindrical parts thereby increasing the steam admission area, the water inlet area and the area of the constricted part of the mixing and diffuser tubes.

If the exhaust steam pressure is very low and does not ensure safe suction for the first stage, it may be advisable to open the overflow of the second stage first, and afterwards the overflow of the third stage, there being no overflow for the first stage at all. Then the higher steam pressure of the second stage will ensure safe starting.

Figure 7:
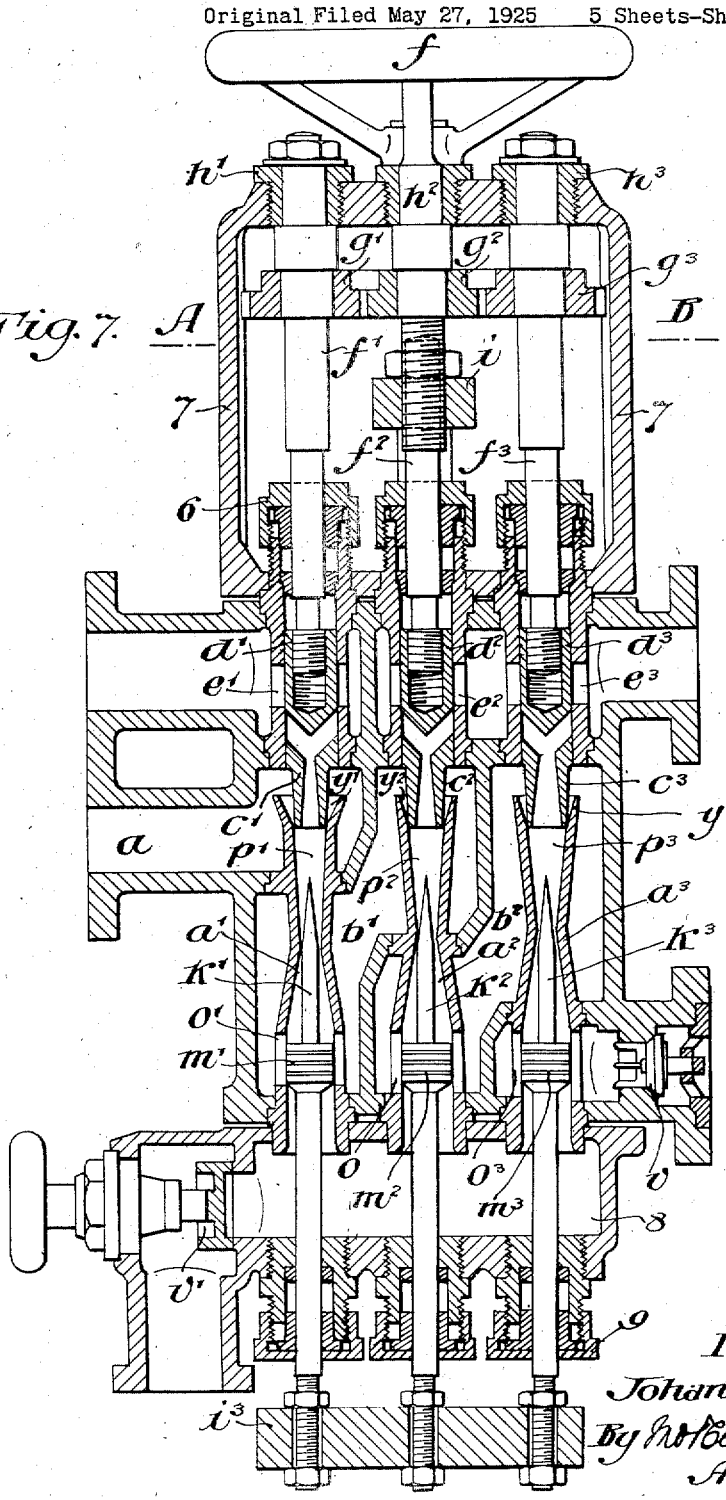
Fig. 7 shows a 3-stage injector, the first stage operated by exhaust steam, the last two stages operated by live steam.

This reasoning is more emphasized by the third stage injectors shown in Figure 7. It has three stages in water and two stages in steam, the first stage being operated by exhaust steam and the last two stages by live steam. With the overflow on the two last stages only as described above, the energetical live steam will draw the water through the first stage and second stage with all safety, so that any overflow device for the first stage is superfluous and exhaust steam of very low pressure can be used for the first stage. It will be noticed, that both live steam chambers of the last two stages are connected.

The adjustment of the steam nozzle can be furthermore improved by using a needle. If a needle is used like that of the diffuser for decreasing the constricted part of the steam nozzle if possible with suitable adjustment of the widening of the steam nozzle it would give a better effect.

What I claim is:—

1. The method of delivering preheated feedwater, which consists in utilizing the injection action of exhaust steam operating for different stages, the said exhaust steam being of different pressures for the different stages.

2. The method of delivering preheated feedwater, which consists in utilizing the injection action of live steam, and exhaust steam operating for different stages, the steam used in some stages being steam that has done work but not expanded down to the exhaust pressure of the cylinders.

3. The method of delivering preheated feedwater, which consists in utilizing the injection action of steam operating for different stages, the live steam operating in some stage or stages and exhaust steam at different pressures operating for other stages.

4. The method of delivering preheated feedwater, which consists in utilizing the injection action of steam operating for different stages and simultaneously controlling the water inlet for each stage.

5. The method of delivering preheated feedwater, which consists in utilizing the injection action of steam operating for different stages and simultaneously and proportionately controlling the water inlet for each stage.

6. Means for delivering preheated feedwater, comprising a multi-stage injector operating with exhaust steam at different pressures in different stages.

7. Means for delivering preheated feedwater, comprising a multi-stage injector operating with exhaust steam at different pressures in different stages and live steam in other stage or stages.

8. Means for delivering preheated feedwater, comprising a multi-stage injector and operating means for the simultaneous control of the water inlets of the several stages.

9. Means for delivering preheated feedwater, comprising a multi-stage injector and operating means for the simultaneous control of the steam and water inlets of the several stages.

10. Means for delivering preheated feedwater comprising a multi-stage injector, and operating means for the simultaneous control of the water inlets and diffusers of the several stages.

11. Means for delivering preheated feedwater, comprising a multi-stage injector, in combination with a plurality of cylinders and means for bleeding steam, which has already done partial work, from one cylinder, means for utilizing the injector action of this steam to draw exhaust steam from another cylinder, and means for utilizing the combined steam thus drawn from the different cylinders for operating one stage of the multi-stage injector.

12. Means for delivering preheated feedwater, comprising a multi-stage injector and means for proportionally adjusting the cross-sections of the steam, water and diffuser nozzles of the several injector stages.

13. Means for delivering preheated feedwater, comprising a multi-stage injector and means for simultaneously controlling all the injector stages and for proportionally adjusting the cross-sections of the steam, water and diffuser nozzles of the several injectors.

14. Means for delivering preheated feedwater, comprising an injector having steam and water nozzles and a diffuser, and means for the simultaneous adjustment of said nozzles.

15. Means for delivering preheated feedwater, comprising an injector having steam and water nozzles and a diffuser, and means for the proportional adjustment of said nozzles.

16. Means for delivering preheated feedwater, comprising an injector having steam and water nozzles and a diffuser, and means for the adjustment of said nozzles and the diffuser.

17. Means for delivering preheated feedwater, comprising an injector having steam and water nozzles and a diffuser, and means for the simultaneous adjustment of said nozzles and the diffuser.

18. Means for delivering preheated feed-water, comprising an injector having steam and water nozzles and a diffuser, and means for the simultaneous and proportional adjustment of said nozzles and the diffuser.

19. Means for delivering preheated feed-water, comprising an injector having steam and water nozzles, a diffuser providing a condensing space, and means for the adjustment of said nozzles, the diffuser and the condensing space.

20. Means for delivering preheated feed-water, comprising an injector having steam and water nozzles, a diffuser and a condensing space, and means for the simultaneous adjustment of said nozzles, the diffuser and the condensing space.

JOHANN STUMPF.